United States Patent
Katayama et al.

(10) Patent No.: US 8,923,024 B2
(45) Date of Patent: Dec. 30, 2014

(54) SERIES CONNECTED MULTI-LEVEL POWER CONVERSION DEVICE

(75) Inventors: Taisuke Katayama, Fukuoka (JP); Ryuji Suenaga, Fukuoka (JP); Kazuhiro Umeo, Fukuoka (JP); Eiji Yamamoto, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 43 days.

(21) Appl. No.: 13/558,346

(22) Filed: Jul. 26, 2012

(65) Prior Publication Data

US 2013/0107588 A1  May 2, 2013

(30) Foreign Application Priority Data

Oct. 28, 2011 (JP) ................................ 2011-237705
Mar. 19, 2012 (JP) ................................ 2012-062698

(51) Int. Cl.
*H02M 7/48* (2006.01)
*H02M 7/49* (2007.01)
*H02M 7/483* (2007.01)

(52) U.S. Cl.
CPC ........ *H02M 7/49* (2013.01); *H02M 2007/4835* (2013.01)
USPC .................. 363/65; 363/64; 363/71; 318/809

(58) Field of Classification Search
CPC .......... H02M 7/47; H02M 2007/4835; H02M 7/497; H02M 5/44; H02M 5/4598
USPC ............. 363/5, 65, 64, 71, 98, 132, 355, 215, 363/39; 318/801, 803, 809
See application file for complete search history.

(56) References Cited

U.S. PATENT DOCUMENTS

| | | | | |
|---|---|---|---|---|
| 5,008,797 A | * | 4/1991 | Patel et al. | 363/43 |
| 5,079,499 A | * | 1/1992 | Owen | 323/361 |
| 5,625,545 A | * | 4/1997 | Hammond | 363/71 |
| 5,986,909 A | * | 11/1999 | Hammond et al. | 363/65 |
| 6,014,323 A | * | 1/2000 | Aiello et al. | 363/71 |
| 6,229,722 B1 | * | 5/2001 | Ichikawa et al. | 363/71 |
| 7,307,361 B1 | * | 12/2007 | Bendre et al. | 307/83 |

FOREIGN PATENT DOCUMENTS

| | | |
|---|---|---|
| JP | 01-125811 | 5/1989 |
| JP | 11-122943 | 4/1999 |
| JP | 11-150869 | 6/1999 |
| JP | 11-266586 | 9/1999 |
| JP | 2000-243636 | 9/2000 |
| JP | 2008-295149 | 12/2008 |

OTHER PUBLICATIONS

Japanese Office Action for corresponding JP Application No. 2012-062698, Sep. 3, 2013.

(Continued)

*Primary Examiner* — Gary L Laxton
*Assistant Examiner* — Kyle J Moody
(74) *Attorney, Agent, or Firm* — Mori & Ward, LLP

(57) ABSTRACT

A series-connected multi-level power conversion device according to an aspect of embodiments includes a multi-winding transformer and a power conversion unit. The multi-winding transformer has a relationship that n secondary windings respectively connected to n single-phase power converters in the same output phase have a voltage phase difference of 60/n degrees and a relationship that the m secondary windings respectively connected to the m single-phase power converters corresponding to the m output phases have a voltage phase difference of 60/m degrees.

5 Claims, 8 Drawing Sheets

(56) References Cited

OTHER PUBLICATIONS

Japanese Office Action for corresponding JP Application No. 2012-062698, Mar. 25, 2014.

Korean Office Action for corresponding KR Application No. 10-2012-0089904. Jun. 21, 2014.

Chinese Office Action for corresponding CN Application No. 201210248140.1, Sep. 2, 2014.

* cited by examiner

SERIES CONNECTED MULTI-LEVEL POWER CONVERSION DEVICE

CROSS-REFERENCE TO RELATED APPLICATIONS

This application is based upon and claims the benefit of priority of the prior Japanese Patent Application No. 2011-237705 filed on Oct. 28, 2011; and, Japanese Patent Application No. 2012-062698 filed on Mar. 19, 2012, the entire contents of both of which are incorporated herein by reference.

FIELD

The embodiments discussed herein are directed to a series-connected multi-level power conversion device.

BACKGROUND

As a conventional power conversion device, there is known a series-connected multi-level power conversion device that has a plurality of output phases each of which is constituted by serially-connected power conversion cells. The series-connected multi-level power conversion device includes a multi-winding transformer and a plurality of single-phase power converters. The multi-winding transformer transforms a multiphase alternating input voltage into a primary winding and outputs the transformed voltage to a plurality of secondary windings. The plurality of single-phase power converters are respectively connected to the secondary windings of the multi-winding transformer.

In the series-connected multi-level power conversion device, the secondary windings of the multi-winding transformer output voltages whose phases are different from one another in order to reduce a harmonic current in the primary winding. More specifically, there has been proposed a method in which, when the series-connected multi-level power conversion device includes nine single-phase power converters, secondary windings connected to three single-phase power converters that constitutes one of U, V, and W phases have a voltage phase difference of 20 degrees and all the secondary windings have a voltage phase difference of 20/3 degrees. This method has been known as disclosed in, for example, Japanese Laid-open Patent Publication No. 2008-295149.

SUMMARY

A series-connected multi-level power conversion device according to an aspect of embodiments includes a multi-winding transformer and a power conversion unit. The multi-winding transformer distributes AC power input into a primary winding to m×n (n and m are coprime) secondary windings. The power conversion unit includes m×n single-phase power converters that are respectively connected to the m×n secondary windings, in which each of m output phases is constituted by serially connected outputs of the n single-phase power converters. The multi-winding transformer has a relationship that the n secondary windings respectively connected to the n single-phase power converters in one output phase have a voltage phase difference of 60/n degrees. Furthermore, the multi-winding transformer has a relationship that the m secondary windings respectively connected to the m single-phase power converters corresponding to the m output phases have a voltage phase difference of 60/m degrees.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, a series-connected multi-level power conversion device according to embodiments of the present disclosure will be explained in detail with reference to the accompanying drawings. In addition, the embodiments disclosed below are not intended to limit the present invention.

First Embodiment

Figure 1:
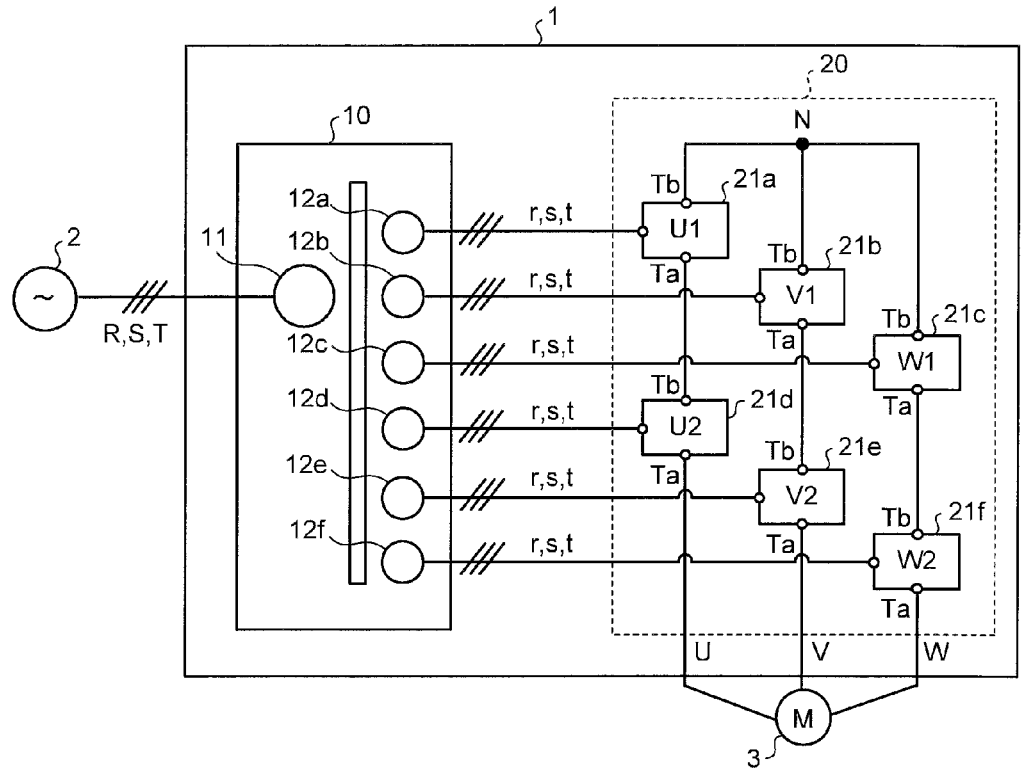
FIG. 1 is a diagram illustrating a series-connected multi-level power conversion device according to a first embodiment.

First, the configuration of a series-connected multi-level power conversion device according to the first embodiment will be explained. FIG. 1 is a diagram illustrating a series-connected multi-level power conversion device 1 according to the first embodiment.

As illustrated in FIG. 1, the series-connected multi-level power conversion device 1 includes a multi-winding transformer 10 and a power conversion unit 20. The series-connected multi-level power conversion device 1 converts an R-phase, S-phase, and T-phase AC power from a three-phase AC power source 2 into an AC power and supplies the converted power to an alternating-current load 3. Herein, as an example, it is explained that the series-connected multi-level power conversion device 1 has three output phases (m=3)

each of which is constituted by two-stage (n=2) single-phase power converters and the alternating-current load 3 is a motor.

The multi-winding transformer 10 includes a primary winding 11 and six secondary windings 12a to 12f (hereinafter, they may be referred to as secondary windings 12). The multi-winding transformer 10 transforms an AC power input into the primary winding 11 and outputs the transformed power to the six secondary windings 12a to 12f. The multi-winding transformer 10 is a phase-shifting transformer that generates voltage phase differences between the primary winding 11 and the secondary windings 12.

The power conversion unit 20 includes six single-phase power converters 21a to 21f (hereinafter, they may be referred to as single-phase power converters 21) that are respectively connected to the six secondary windings 12a to 12f. Each of the single-phase power converters 21 converts three-phase AC power from the corresponding secondary winding 12 into single-phase AC power and outputs the converted AC power through its own output terminals Ta and Tb.

In the power conversion unit 20, serially-connected outputs of the two single-phase power converters 21 constitute one output phase. In other words, a U-phase power conversion unit is constituted by the single-phase power converters 21a and 21d, a V-phase power conversion unit is constituted by the single-phase power converters 21b and 21e, and a W-phase power conversion unit is constituted by the single-phase power converters 21c and 21f.

More specifically, the output terminal Tb of the single-phase power converter 21a is connected to a neutral point N, and the output terminal Ta of the single-phase power converter 21a is connected to the output terminal Tb of the single-phase power converter 21d. This connection leads to the configuration of the U-phase power conversion unit whose output terminal is the output terminal Ta of the single-phase power converter 21d.

Similarly, the output terminals Tb of the single-phase power converters 21b and 21c are connected to the neutral point N, and the output terminals Ta of the single-phase power converters 21b and 21c are respectively connected to the output terminals Tb of the single-phase power converters 21e and 21f. These connections lead to the configurations of the V-phase and W-phase power conversion units whose output terminals are the output terminals Ta of the single-phase power converters 21e and 21f.

Figure 2:
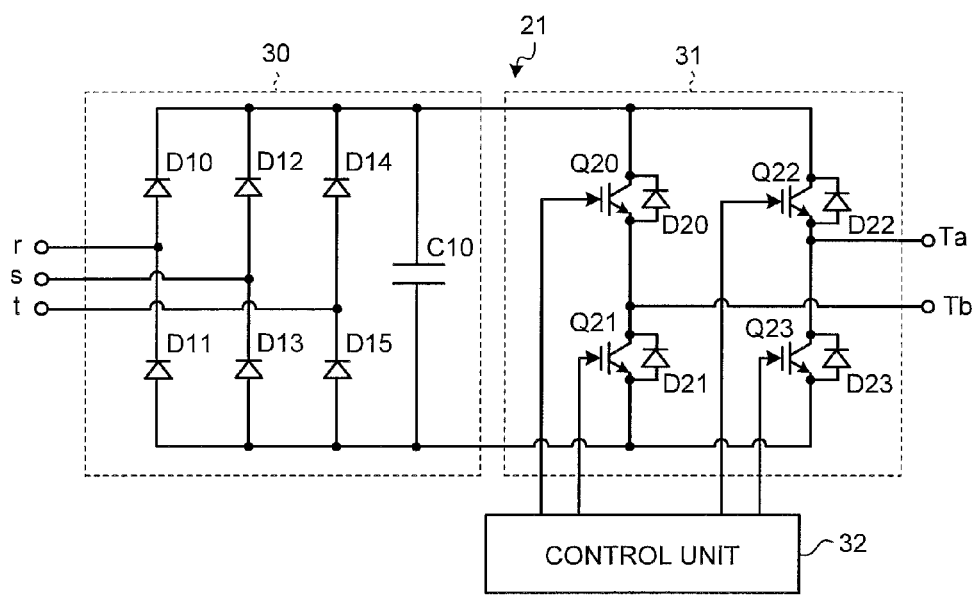
FIG. 2 is a diagram illustrating a circuit block of a single-phase power converter illustrated in FIG. 1.

Now, the configuration of the single-phase power converter 21 will be explained. FIG. 2 is a diagram illustrating a circuit block of the single-phase power converter 21. As illustrated in FIG. 2, the single-phase power converter 21 includes a rectification/smoothing unit 30, an inverter unit 31, and a control unit 32.

The rectification/smoothing unit 30 includes diodes D10 to D15 and a capacitor C10. The rectification/smoothing unit 30 converts the three-phase (r phase, s phase, and t phase) AC power from the corresponding secondary winding 12 into a DC power. In this case, the diodes D10 and D11 perform full-wave rectification on the r-phase power, the diodes D12 and D13 perform full-wave rectification on the s-phase power, and the diodes D14 and D15 perform full-wave rectification on the t-phase power. Then, the voltage rectified by the diodes D10 to D15 is smoothed by the capacitor C10.

The inverter unit 31 includes transistors Q20 to Q23 and diodes D20 to D23. The transistors Q20 and Q21 are serially connected between the outputs of the rectification/smoothing unit 30. Similarly, the transistors Q22 and Q23 are serially connected between the outputs of the rectification/smoothing unit 30. Herein, the diodes D20 to D23 are freewheeling diodes.

The control unit 32 controls ON/OFF states of the transistors Q20 to Q23 of the inverter unit 31 to make the inverter unit 31 convert the DC power of the rectification/smoothing unit 30 into single-phase AC power. The transistors Q20 to Q23 uses power semiconductor devices such as IGBT and MOSFET. The inverter unit 31 is not limited to the configuration of the two-level inverter illustrated in FIG. 2. For example, the inverter unit 31 can employ the configuration of a multi-level inverter such as a three-level inverter. Moreover, the inverter unit 31 can employ the other various configurations.

Figure 3:
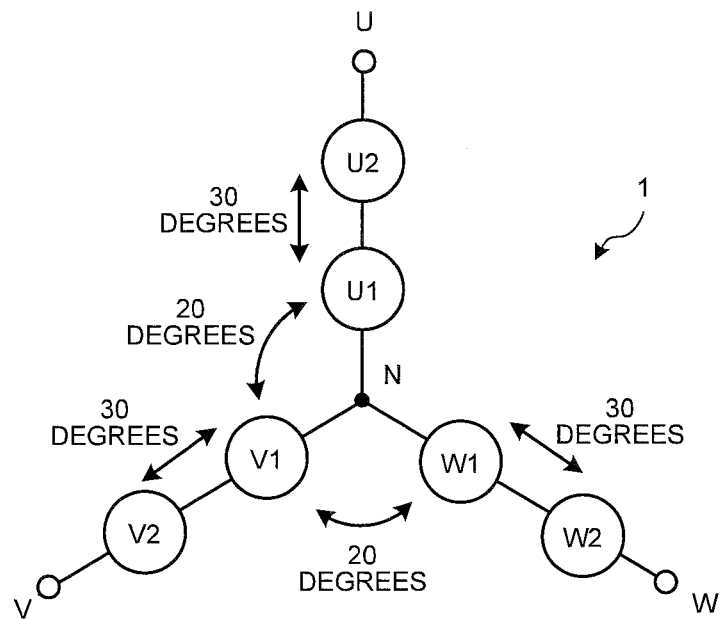
FIG. 3 is a diagram illustrating voltage phase differences between secondary windings of a multi-winding transformer.
Figure 4:
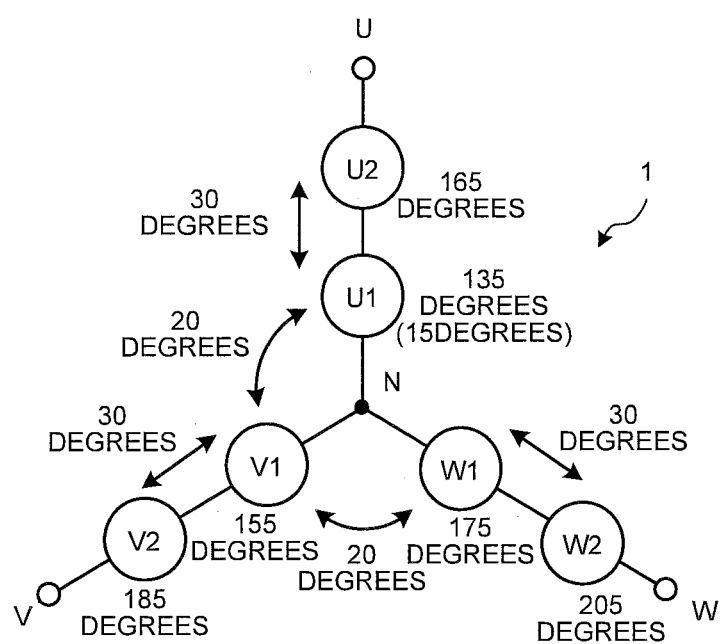
FIG. 4 is a diagram illustrating a voltage phase relationship among the secondary windings of the multi-winding transformer.

Next, the configuration of the multi-winding transformer 10 will be explained. FIG. 3 is a diagram illustrating voltage phase differences between the secondary windings 12a to 12f. FIG. 4 is a diagram illustrating a voltage phase relationship among the secondary windings 12a to 12f. As described above, the single-phase power converters 21a to 21f are respectively located at U1, V1, W1, U2, V2, and W2, and are respectively connected to the secondary windings 12a to 12f (see FIG. 1). Herein, in the symbols U1 to W2, characters U, V, and W indicate output phases and numbers "1" and "2" indicate the order of stages that are serially connected in one output phase. Therefore, the secondary winding 12a corresponds to the position U1, the secondary winding 12b corresponds to the position V1, the secondary winding 12c corresponds to the position W1, the secondary winding 12d corresponds to the position U2, the secondary winding 12e corresponds to the position V2, and the secondary winding 12f corresponds to the position W2.

As illustrated in FIG. 3, in the multi-winding transformer 10 according to the first embodiment, a voltage phase difference between the two secondary windings 12 respectively connected to the two single-phase power converters 21 in the same output phase is 30 degrees. More specifically, in the case of the U phase, a voltage phase difference between the secondary winding 12a corresponding to the position U1 and the secondary winding 12d corresponding to the position U2 is 30 degrees.

Similarly, in the case of the V phase, a voltage phase difference between the secondary winding 12b corresponding to the position V1 and the secondary winding 12e corresponding to the position V2 is 30 degrees. Moreover, in the case of the W phase, a voltage phase difference between the secondary winding 12c corresponding to the position W1 and the secondary winding 12f corresponding to the position W2 is 30 degrees.

On the other hand, in the multi-winding transformer 10, a voltage phase difference between the two secondary windings 12 respectively connected to the two single-phase power converters 21 corresponding to the different output phases is 20 degrees. More specifically, a voltage phase difference between the secondary winding 12a corresponding to the position U1 and the secondary winding 12b corresponding to the position V1 is 20 degrees. Moreover, a voltage phase difference between the secondary winding 12b corresponding to the position V1 and the secondary winding 12c corresponding to the position W1 is 20 degrees.

Now, a specific example of the voltage phase differences between the secondary windings 12a to 12f will be explained with reference to FIG. 4. As illustrated in FIG. 4, the voltage phases of the secondary windings 12 are (135 degrees, 155 degrees, 165 degrees, 175 degrees, 185 degrees, 205 degrees) in order of (U1, V1, U2, W1, V2, W2). These voltage phases of the secondary windings 12 are defined as phase differences between the voltages of the secondary windings 12 and the voltage of the primary winding 11.

Therefore, the voltage phases of the secondary windings 12 are (U1, U2)=(135 degrees, 165 degrees) in the U phase, (V1, V2)=(155 degrees, 185 degrees) in the V phase, and (W1, W2)=(175 degrees, 205 degrees) in the W phase. The voltage phase difference between the voltages of the secondary windings 12 in the same output phase is 30 degrees. Moreover, two groups of the voltage phases of the secondary windings 12 corresponding to the different output phases are (U1, V1, W1)=(135 degrees, 155 degrees, 175 degrees) and (U2, V2, W2)=(165 degrees, 185 degrees, 205 degrees), and the two voltage phase differences in one group are 20 degrees.

Figure 5:
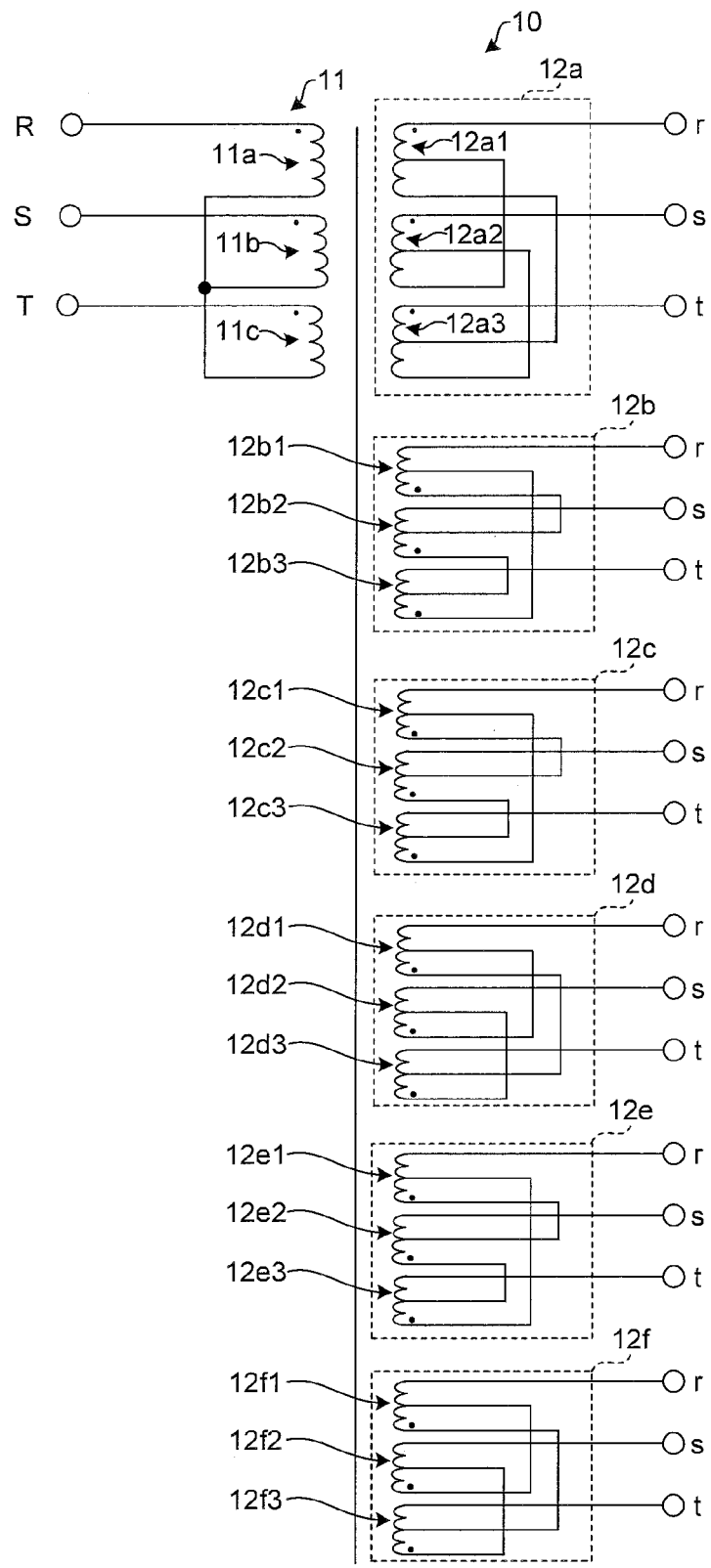
FIG. 5 is a diagram illustrating wiring of the multi-winding transformer.

A configuration example of the multi-winding transformer 10 having the voltage phase relationship between the secondary windings 12 illustrated in FIG. 4 is explained with reference to FIG. 5. FIG. 5 is a diagram illustrating wiring of the multi-winding transformer 10.

As illustrated in FIG. 5, the secondary winding 12a is formed by extended delta connection. More specifically, an R-phase primary winding 11a and a secondary winding 12a1 are wound around the same iron core isolated by an insulation member, an S-phase primary winding 11b and a secondary winding 12a2 are wound around the same iron core isolated by the insulation member, and a T-phase primary winding 11c and a secondary winding 12a3 are wound around the same iron core isolated by the insulation member. All the secondary windings 12a1 to 12a3 have taps provided between their coil ends thereof.

In FIG. 5, each winding includes a coil end that has a black dot and a coil end that does not have the black dot. When considering a pair of the primary winding and one of the plurality of secondary windings, a black dot is put on one side of coil ends of each winding in such a manner that magnetic fluxes made by both the windings have directions in which the fluxes are reinforced each other when currents flow into from the coil ends of the two windings that have black dots. Herein, the coil end that has the black dot is referred to as a positive coil end and the coil end opposite to the positive coil end is referred to as a negative coil end. In FIG. 5, the positive coil ends of the secondary windings 12a1, 12a2, and 12a3 respectively correspond to the output ends of r-phase, s-phase, and t-phase. Moreover, the negative coil end of the secondary winding 12a1 is connected to the tap of the secondary winding 12a3, the negative coil end of the secondary winding 12a3 is connected to the tap of the secondary winding 12a2, and the negative coil end of the secondary winding 12a2 is connected to the tap of the secondary winding 12a1.

Figure 6:
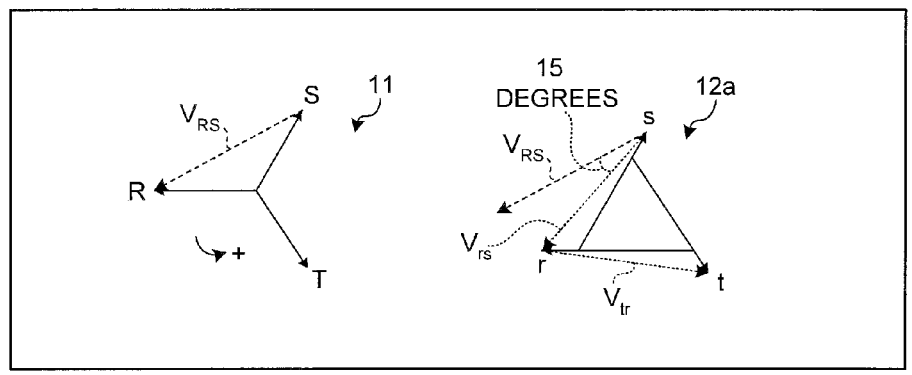
FIGS. 6 to 8 are diagrams illustrating relationships between line voltage vectors of a primary winding and line voltage vectors of the secondary winding of the multi-winding transformer.

Herein, a relationship between the line voltage vectors of the primary winding 11 and the line voltage vectors of the secondary winding 12a when the connection illustrated in FIG. 5 is made will be explained with reference to FIG. 6. FIG. 6 is a diagram illustrating a relationship between the line voltage vectors of the primary winding 11 and the line voltage vectors of the secondary winding 12a. The output phases of the three-phase AC power source 2 are delayed in order of an R phase, an S phase, and a T phase to have a voltage phase difference of 120 degrees.

When the secondary windings 12a1, 12a2, and 12a3 are connected as described above, line voltage vectors $V_{rs}$, $V_{st}$, and $V_{tr}$ between the phases of the secondary windings 12a1, 12a2, and 12a3 are expressed with the following Equations (1) to (3) by using phase voltage vectors $V_r$, $V_s$, and $V_t$.

$$V_{rs} = V_r - V_s \quad (1)$$

$$V_{st} = V_s - V_t \quad (2)$$

$$V_{tr} = V_t - V_r \quad (3)$$

For example, the line voltage vectors $V_{rs}$ and $V_{tr}$ are as illustrated in FIG. 6. When the phase of a line voltage vector $V_{RS}$ from the S phase to the R phase of the primary winding 11 is defined as a base phase, the phase of the line voltage vector $V_{rs}$ from the s phase to the r phase of the secondary winding 12a is advanced 15 degrees with respect to the base phase.

In the secondary winding 12a, the phase of the line voltage vector $V_{tr}$ from the r phase to the t phase is advanced 120 degrees with respect to the phase of the line voltage vector $V_{rs}$ and 135 degrees with respect to the base phase. Moreover, the phase of the line voltage vector $V_{st}$ from the t phase to the s phase is advanced 240 degrees with respect to the phase of the line voltage vector $V_{rs}$ and 255 degrees with respect to the base phase. Therefore, the secondary winding 12a is a secondary winding with a voltage phase that is advanced 15 degrees with respect to the base phase and is also a secondary winding with a voltage phase that is advanced 135 degrees with respect to the base phase. Furthermore, the secondary winding 12a is a secondary winding with a voltage phase that is advanced 255 degrees with respect to the base phase.

Returning to FIG. 5, the secondary winding 12b is explained. As illustrated in FIG. 5, the secondary winding 12b is formed by extended delta connection. More specifically, the R-phase primary winding 11a and a secondary winding 12b1 are wound around the same iron core isolated by the insulation member, the S-phase primary winding 11b and a secondary winding 12b2 are wound around the same iron core isolated by the insulation member, and the T-phase primary winding 11c and a secondary winding 12b3 are wound around the same iron core isolated by the insulation member. All the secondary windings 12b1 to 12b3 have taps provided between their coil ends thereof.

The negative coil ends of the secondary windings 12b1, 12b2, and 12b3 respectively correspond to the output ends of r-phase, s-phase, and t-phase. Moreover, the positive coil end of the secondary winding 12b1 is connected to the tap of the secondary winding 12b2, the positive coil end of the secondary winding 12b2 is connected to the tap of the secondary winding 12b3, and the positive coil end of the secondary winding 12b3 is connected to the tap of the secondary winding 12b1.

Figure 7:
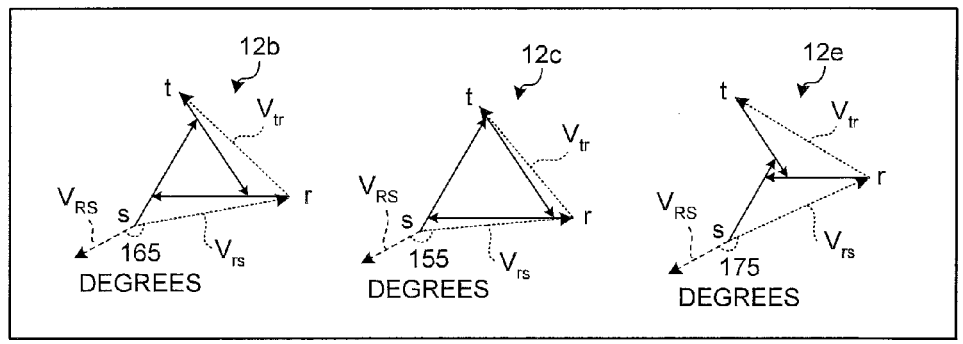

Now, a relationship between the line voltage vectors of the primary winding 11 and the line voltage vectors of the secondary winding 12b when the connection illustrated in FIG. 5 is made will be explained with reference to FIG. 7. FIG. 7 is a diagram illustrating a relationship between the line voltage vectors of the primary winding 11 and the line voltage vectors of the secondary windings 12b, 12c, and 12e. Herein, the phase of the line voltage vector $V_{RS}$ (see FIG. 6) from the S phase to the R phase is defined as the base phase.

When the secondary windings 12b1, 12b2, and 12b3 are connected as described above, line voltage vectors $V_{rs}$, $V_{st}$, and $V_{tr}$ between the phases of the secondary windings 12b1, 12b2, and 12b3 are expressed with Equations (1) to (3) by using the phase voltage vectors $V_r$, $V_s$, and $V_t$, similarly to the case of the secondary winding 12a.

For example, the line voltage vector $V_{rs}$ is as illustrated in FIG. 7. In other words, the phase of the line voltage vector $V_{rs}$ from the s phase to the r phase of the secondary winding 12b is advanced 165 degrees with respect to the base phase.

Similarly, the connections (FIG. 5) for the secondary windings 12c and 12e are performed similarly to the secondary winding 12b, and the phases of the line voltage vectors $V_{rs}$ from the s phase to the r phase of the secondary windings 12c and 12e are respectively advanced 155 degrees and 175 degrees with respect to the base phase. In this case, the position of each tap of the secondary windings 12c and 12e is different from that of the secondary winding 12b. In other words, the secondary windings 12c and 12e have the number of windings of a delta portion different from that of the secondary winding 12b.

Returning to FIG. 5, the secondary winding 12d is explained. As illustrated in FIG. 5, the secondary winding 12d is also formed by extended delta connection. More specifically, the R-phase primary winding 11a and a secondary winding 12d1 are wound around the same iron core isolated by the insulation member, the S-phase primary winding 11b and a secondary winding 12d2 are wound around the same iron core isolated by the insulation member, and the T-phase primary winding 11c and a secondary winding 12d3 are wound around the same iron core isolated by the insulation member. All the secondary windings 12d1 to 12d3 have taps provided between their coil ends thereof.

The negative coil ends of the secondary windings 12d1, 12d2, and 12d3 respectively correspond to the output ends of r-phase, s-phase, and t-phase. Moreover, the positive coil end of the secondary winding 12d1 is connected to the tap of the secondary winding 12d3, the positive coil end of the secondary winding 12d2 is connected to the tap of the secondary winding 12d1, and the positive coil end of the secondary winding 12d3 is connected to the tap of the secondary winding 12d2.

Figure 8:
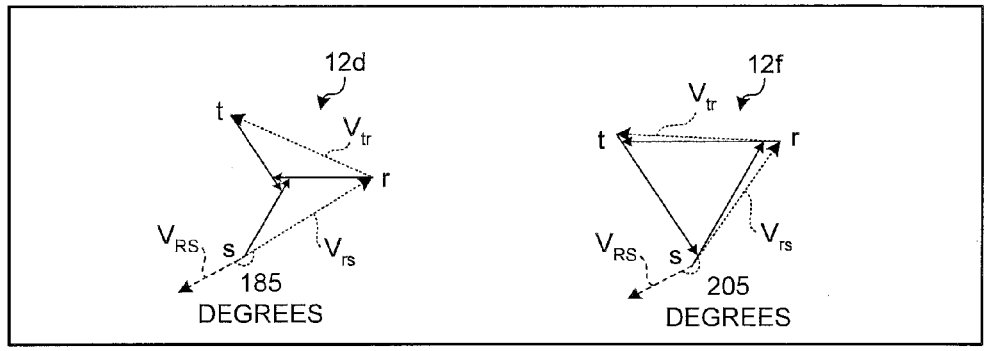

Now, a relationship between the line voltage vectors of the primary winding 11 and the line voltage vectors of the secondary windings 12d and 12f when the connection illustrated in FIG. 5 is performed will be explained with reference to FIG. 8. FIG. 8 is a diagram illustrating a relationship between the line voltage vectors of the primary winding 11 and the line voltage vectors of the secondary windings 12d and 12f. Herein, the phase of the line voltage vector $V_{RS}$ (see FIG. 6) from the S phase to the R phase is defined as the base phase.

When the secondary windings 12d1, 12d2, and 12d3 are connected as described above, the line voltage vectors $V_{rs}$, $V_{st}$, and $V_{tr}$ between the phases of the secondary windings 12d1, 12d2, and 12d3 are expressed with Equations (1) to (3) by using the phase voltage vectors $V_r$, $V_s$, and $V_t$, similarly to the case of the secondary winding 12a. For example, the phase of the line voltage vector $V_{rs}$ of the line voltage vectors $V_{rs}$, $V_{st}$, and $V_{tr}$ is advanced 185 degrees with respect to the base phase as illustrated in FIG. 8.

Similarly, as illustrated in FIG. 8, the connection (FIG. 5) for the secondary winding 12f is performed similarly to the secondary winding 12b, and the phase of the line voltage vector $V_{rs}$ from the s phase to the r phase of the secondary winding 12f is advanced 205 degrees with respect to the base phase. In this case, the position of each tap of the secondary winding 12f is different from that of the secondary winding 12d. In other words, the secondary winding 12f has the number of windings of a delta portion different from that of the secondary winding 12d.

Figure 9:
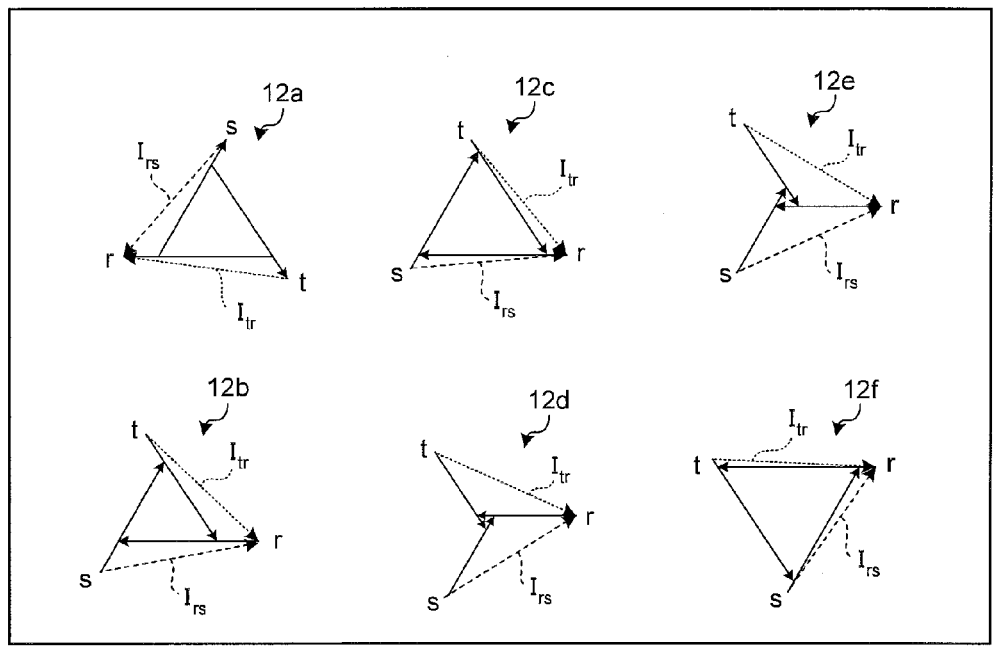
FIG. 9 is a diagram illustrating current vectors of each secondary winding of the multi-winding transformer.
Figure 10:
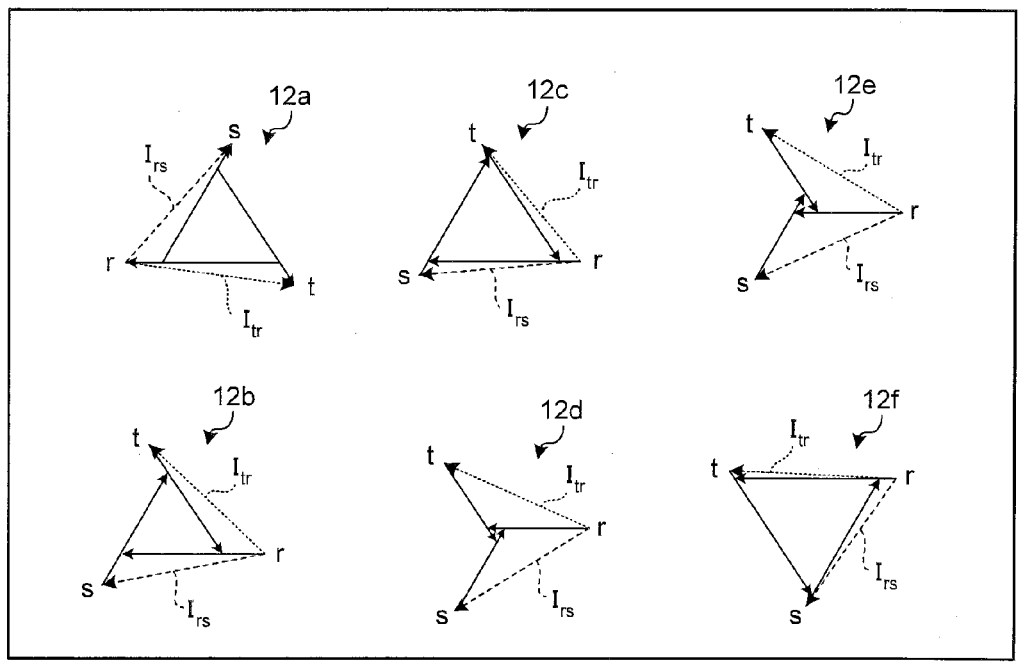
FIG. 10 is a diagram illustrating current vectors of each secondary winding of the multi-winding transformer.

Next, current vectors of the secondary windings 12 of the multi-winding transformer 10 will be explained with reference to FIGS. 9 and 10. FIGS. 9 and 10 are diagrams illustrating current vectors of the secondary windings 12 of the multi-winding transformer 10.

In FIGS. 9 and 10, a current vector $I_{rs}$ indicates a current between the r phase and the s phase and a current vector $I_{tr}$ indicates a current between the t phase and the r phase. The current vector $I_{rs}$ is a vector of a current of charging the capacitor C10 via the diodes D10, D11, D12 and D13 (see FIG. 2) connected to the r phase and the s phase. The current vector $I_{tr}$ is a vector of a current of charging the capacitor C10 via the diodes D10, D11, D14, and D15 connected to the t phase and the r phase.

A current indicated by the current vector $I_{rs}$ flows when a line voltage between the r phase and the s phase among three line voltages becomes the maximum or minimum. A current indicated by the current vector $I_{tr}$ flows when a line voltage between the t phase and the r phase among the three line voltages becomes the maximum or minimum. Hereinafter, it is assumed that the positive direction of a current vector indicated by a symbol is a direction in which a current flows from the secondary winding 12 to the rectification/smoothing unit 30 in the phase designated by the first subscript of the two subscripts of the symbol and flows from the rectification/smoothing unit 30 to the secondary winding 12 in the phase designated by the second subscript.

When the line voltage between the r phase and the phase becomes the maximum, an r-phase voltage is a positive voltage and an s-phase voltage is a negative voltage. Therefore, when the line voltage between the r phase and the s phase is the maximum, a current flows from each the secondary winding 12 to the rectification/smoothing unit 30 in the r phase and a current flows from the rectification/smoothing unit 30 to each the secondary winding 12 in the s phase. Therefore, the direction of the current vector $I_{rs}$ at this time is positive and, as illustrated in FIG. 9, the current vectors $I_{rs}$ have the same directions as those of the line voltage vectors $V_{rs}$ in FIGS. 6 to 8.

When the line voltage between the t phase and the r phase becomes the minimum, a t-phase voltage is a negative voltage and the r-phase voltage is a positive voltage. Therefore, when the line voltage between the t phase and the r phase is the minimum, a current flows from the rectification/smoothing unit 30 to each the secondary winding 12 in the t phase and a current flows from each the secondary winding 12 to the rectification/smoothing unit 30 in the r phase. Therefore, the direction of the current vector $I_{tr}$ at this time is negative and, as illustrated in FIG. 9, the current vectors $I_{tr}$ have the directions opposite to those of the line voltage vectors $V_{tr}$ in FIGS. 6 to 8.

When the line voltage between the r phase and the s phase becomes the minimum, the r-phase voltage is a negative voltage and the s-phase voltage is a positive voltage. Therefore, when the line voltage between the r phase and the s phase is the minimum, a current flows from the rectification/smoothing unit 30 to each the secondary winding 12 in the r phase and a current flows from each the secondary winding 12 to the rectification/smoothing unit 30 in the s phase. Therefore, the direction of the current vector $I_{rs}$ at this time is negative and, as illustrated in FIG. 10, the current vectors $I_{rs}$ have the directions opposite to those of the line voltage vectors $V_{rs}$ in FIGS. 6 to 8.

When the line voltage between the t phase and the r phase becomes the maximum, the t-phase voltage is a positive voltage and the r-phase voltage is a negative voltage. Therefore, when the line voltage between the t phase and the r phase is the maximum, a current flows from each the secondary winding 12 to the rectification/smoothing unit 30 in the t phase and a current flows from the rectification/smoothing unit 30 to each the secondary winding 12 in the s phase. Therefore, the direction of the current vector $I_{tr}$ of the current between the t phase and the r phase at this time is positive and, as illustrated in FIG. 10, the current vectors $I_{tr}$ have the same directions as those of the line voltage vectors $V_{tr}$ in FIGS. 6 to 8.

Figure 11:
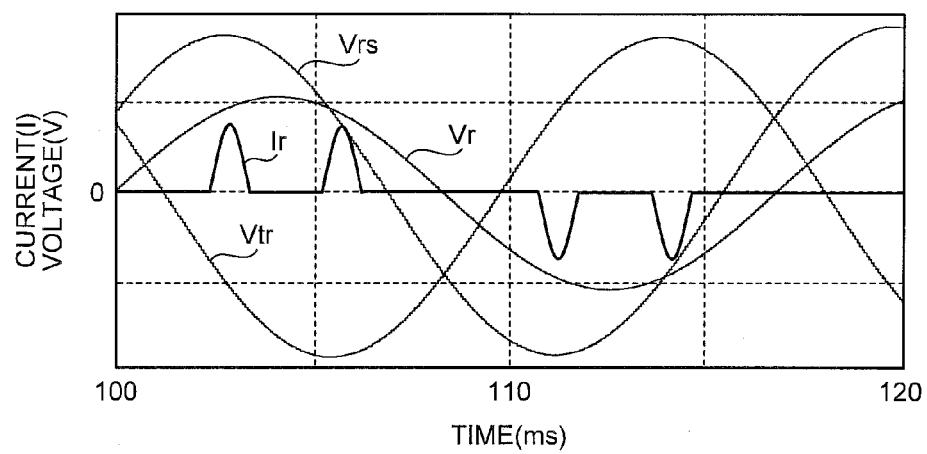
FIG. 11 is a diagram explaining a current in each secondary winding in an r phase.

As described above, the current in each the secondary winding 12 in the r phase can flow in four cases where the line voltage between the r phase and the s phase is the maximum and minimum and where the line voltage between the t phase and the r phase is the minimum and maximum. FIG. 11 is a diagram explaining a current in each the secondary winding 12 in the r phase. A relationship of a line voltage Vrs between the r phase and the s phase, a line voltage Vtr between the t phase and the r phase, a phase voltage Vr of the r phase, and a phase current Ir of the r phase is illustrated in FIG. 11. As illustrated in FIG. 11, a steepled-wave current actually flows in the four cases. In the case of the s phase and the t phase, currents flow through the secondary windings 12 similarly to the case of the r phase.

Next, currents in the R-phase primary winding 11a caused by the currents in the secondary windings 12a to 12f will be explained. First, the current in the secondary winding 12a is explained as an example. When a current flows through the secondary winding 12a1, a current for canceling a magnetomotive force caused by the current in the secondary winding 12a1 flows through the R-phase primary winding 11a wound around the same iron core as the secondary winding 12a1 is wound around. In other words, a current for canceling a magnetomotive force caused by the current vector $I_{rs}$ and the current vector $I_{tr}$ described above flows through the primary winding 11a.

In the case of the current in the primary winding 11a, it is assumed that a direction of a current flowing out of the primary winding 11a is a positive direction. In the wiring of the windings illustrated in FIG. 5, from the definition of a positive coil end described above, it turns out that the direction of the current in the primary winding 11a for cancelling the magnetomotive force caused by the current flowing out of the secondary winding 12a1 is a direction of a current flowing into the primary winding 11a, namely, a negative direction opposite to that of the secondary winding 12a1.

Because the current vector $I_{rs}$ flows through a star connection portion of the secondary winding 12a1, a current, whose direction is an opposite direction to the current vector $I_{rs}$ and magnitude is obtained by multiplying the magnitude of the current vector $I_{rs}$ by a winding ratio of the primary winding 11a and the star connection portion of the secondary winding 12a1, flows through the primary winding 11a. Moreover, because the current vector $I_{tr}$ flows through the star and delta connection portions of the secondary winding 12a1, a current, whose direction is an opposite direction to the current vector $I_{tr}$ and magnitude is obtained by multiplying the magnitude of the current vector $I_{tr}$ by a winding ratio of the primary winding 11a and the secondary winding 12a1, also flows through the primary winding 11a.

Next, a current in the secondary winding 12b will be explained. Also, in the case of the secondary winding 12b, a current for cancelling a magnetomotive force caused by the current vector $I_{rs}$ and the current vector $I_{tr}$ of the secondary winding 12b1 flows through the primary winding 11a, in which the secondary winding 12b1 and the primary winding 11a are wound around the same iron core. From the wiring of the windings illustrated in FIG. 5, it turns out that the direction of the current in the primary winding 11a for canceling the magnetomotive force caused by the current flowing out of the secondary winding 12b1 is a direction of a current flowing out of the primary winding 11a, namely, the positive direction same as that of the secondary winding 12b.

Because the current vector $I_{rs}$ flows through the star and delta connection portions in the secondary winding 12b1, a current, whose direction is the same direction as the current vector $I_{rs}$ and magnitude is obtained by multiplying the magnitude of the current vector $I_{rs}$ by a winding ratio of the primary winding 11a and the secondary winding 12b1, also flows through the primary winding 11a. Moreover, because the current vector $I_{tr}$ flows through the star connection portion of the secondary winding 12b1, a current, whose direction is the same direction as the current vector $I_{tr}$ and magnitude is obtained by multiplying the magnitude of the current vector $I_{tr}$ by a winding ratio of the primary winding 11a and the star connection portion of the secondary winding 12b1, flows through the primary winding 11a.

Also, in the case of the secondary windings 12c and 12e, a current for cancelling a magnetomotive force caused by the current vector $I_{rs}$ and the current vector $I_{tr}$ of each of secondary windings 12c1 and 12e1 flows through the primary winding 11a, in which each of the secondary windings 12c1 and 12e1 and the primary winding 11a are wound around the same iron core. Because the connection state of the secondary windings 12c1 and 12e1 is the same as that of the secondary winding 12b1 as illustrated in FIG. 5, currents by the current vectors $I_{rs}$ and $I_{tr}$ of the secondary windings 12c1 and 12e1 flow through the primary winding 11a in accordance with the same converting action as that of the secondary winding 12b1.

Next, a current in the secondary winding 12d will be explained. Also, in the case of the secondary winding 12d, a current for cancelling a magnetomotive force caused by the current vector $I_{rs}$ and the current vector $I_{tr}$ of the secondary winding 12d1 flows through the primary winding 11a, in which the secondary winding 12d1 and the primary winding 11a are wound around the same iron core. From the wiring of the windings illustrated in FIG. 5, it turns out that the direction of the current in the primary winding 11a for canceling the magnetomotive force caused by the current flowing out of the secondary winding 12d1 is a direction flowing out of the primary winding 11a similarly to the secondary windings 12b1, 12c1, and 12e1, namely, the positive direction similarly to the secondary winding 12d1.

Because the current vector $I_{rs}$ flows through the star connection portion in the secondary winding 12d1, a current, whose direction is the same direction as the current vector $I_{rs}$ and magnitude is obtained by multiplying the magnitude of the current vector $I_{rs}$ by a winding ratio of the primary winding 11a and the star connection portion of the secondary winding 12d1, also flows through the primary winding 11a. Moreover, because the current vector $I_{tr}$ flows through the star and delta connection portions of the secondary winding 12d1, a current, whose direction is the same direction as the current vector $I_{tr}$ and magnitude is obtained by multiplying the magnitude of the current vector $I_{tr}$ by a winding ratio of the primary winding 11a and the secondary winding 12d1, flows through the primary winding 11a.

Also, in the case of the secondary winding 12f, a current for cancelling a magnetomotive force caused by the current vector $I_{rs}$ and the current vector $I_{tr}$ of a secondary winding 12f1 flows through the primary winding 11a, in which the secondary winding 12f1 and the primary winding 11a are wound around the same iron core. Because the connection state of the secondary winding 12f1 is the same as that of the secondary winding 12d1 as illustrated in FIG. 5, the current by the current vectors $I_{rs}$ and $I_{tr}$ of the secondary winding 12f1 flows through the primary winding 11a in accordance with the same converting action as the case of the secondary winding 12d1.

As described above, the current, whose direction is the above direction with respect to the current vectors $I_{rs}$ and $I_{tr}$ of each of the secondary windings 12 and magnitude is in accordance with the winding ratio of the primary winding 11a and the winding of the secondary windings 12 through which the r-phase current flows due to the current vectors $I_{rs}$ and $I_{tr}$, flows through the primary winding 11a.

Figure 12:
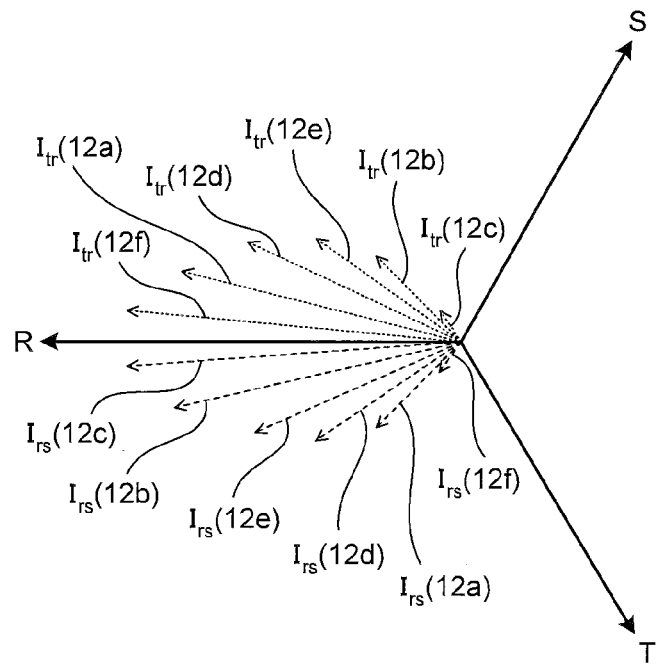
FIG. 12 is a diagram illustrating current vectors in the primary winding caused by currents in the secondary windings when a primary voltage is positive.

Therefore, the current vectors of the currents in the primary winding 11a caused by the currents in the secondary windings 12a to 12f are as illustrated in FIG. 12. FIG. 12 is a diagram illustrating the current vectors of the currents in the primary winding 11a caused by the currents in the secondary windings 12a to 12f when the r-phase voltage in the secondary windings 12a to 12f is positive.

Figure 13:
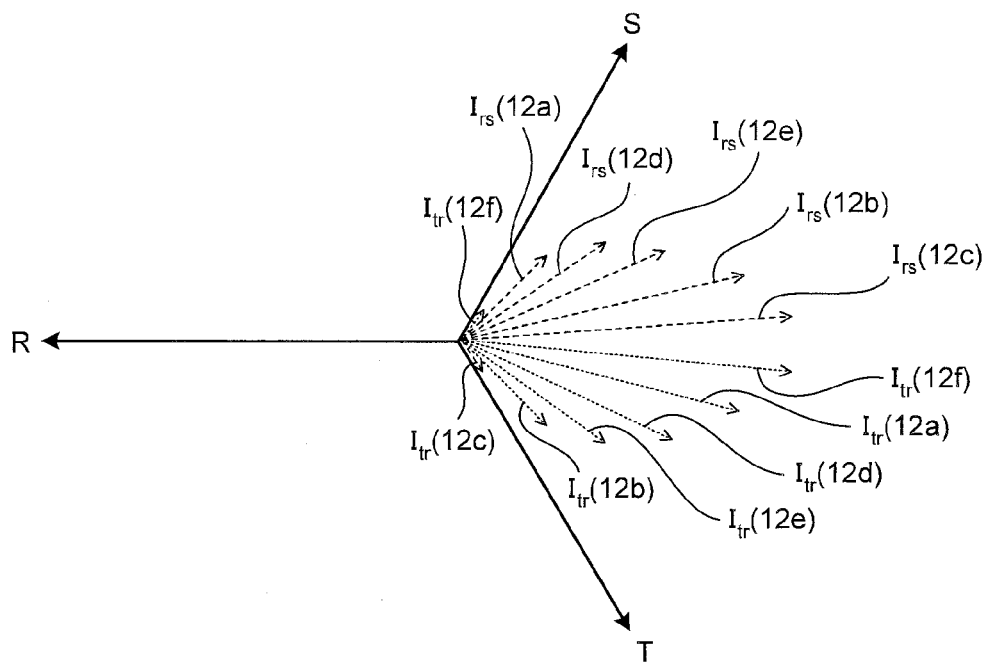
FIG. 13 is a diagram illustrating current vectors in the primary winding caused by currents in the secondary windings when the primary voltage is negative.

On the other hand, as illustrated in FIG. 13, when the phase voltage Vr of the r phase is negative, the current vectors of the currents in the primary winding 11a caused by the currents in the secondary windings 12a to 12f have a phase difference of 180 degrees with respect to the current vectors illustrated in FIG. 12. FIG. 13 is a diagram illustrating the current vectors of the currents in the primary winding 11a caused by the currents in the secondary windings 12a to 12f when the phase voltage Vr of the r-phase in the secondary windings 12a to 12f is negative.

Therefore, the current vectors of the currents in the primary winding 11a caused by the currents in the secondary windings 12a to 12f when a primary voltage $V_R$ is the positive voltage are as illustrated in FIG. 12. On the other hand, the current vectors of the currents in the primary winding 11a caused by the currents in the secondary windings 12a to 12f when the primary voltage $V_R$ is the negative voltage are as illustrated in FIG. 13.

As illustrated in FIGS. 12 and 13, the currents with the phase difference of 10 degrees in the primary winding 11a caused by the current vectors $I_{rs}$ and $I_{tr}$ of the secondary windings 12a to 12f are symmetrically distributed with respect to the phase at which the R-phase voltage is the maximum. The current vector $I_{rs}$ of each the secondary winding 12 flows when the line voltage between the r phase and the s phase becomes the maximum or minimum among the three line voltages as described above, and its waveform is steepled. Moreover, the current vector $I_{tr}$ of each the secondary winding 12 flows when the line voltage between the t phase and the r phase becomes the maximum or minimum among the three line voltages as described above, and its waveform is steepled.

However, because the current vectors of the currents in the primary winding 11a caused by the currents in the secondary windings 12 are distributed as described above, an influence by the steepled-wave currents is dispersed and thus current harmonics are reduced. Because the same currents also flow through the S-phase and T-phase primary windings 11b and 11c, the current harmonics of the three-phase AC power source 2 are able to be reduced.

As described above, the series-connected multi-level power conversion device 1 of the first embodiment has a relationship that the voltage phase difference between the two secondary windings 12 respectively connected to the two single-phase power converters 21 in the same output phase is 30 degrees. Furthermore, the series-connected multi-level power conversion device 1 has a relationship that the voltage phase difference between the three secondary windings 12 respectively connected to the three single-phase power converters 21 corresponding to three output phases of the U phase, the V phase, and the W phase is 20 degrees.

In the first embodiment, this configuration in the series-connected multi-level power conversion device 1 with the six single-phase power converters 21a to 21f connected to the six secondary windings 12a to 12f generates steepled-wave currents with the phase difference of 10 degrees in the primary winding 11 as illustrated in FIG. 12 or 13. Therefore, an influence by the steepled-wave currents can be dispersed and thus current harmonics of the three-phase AC power source 2 are able to be reduced.

Figure 14:
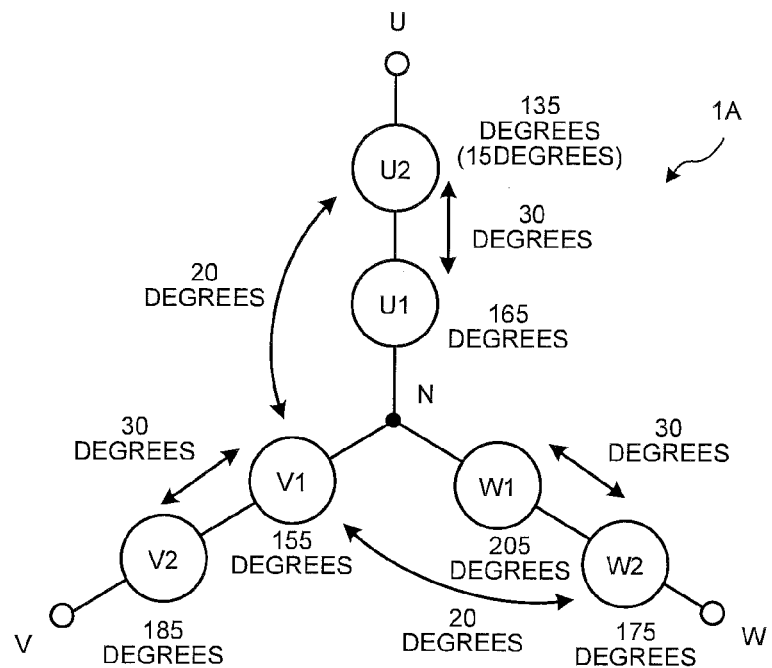
FIG. 14 is a diagram illustrating another voltage phase relationship among the secondary windings of the multi-winding transformer.

In the example described above, it has been explained that the voltage phase difference between the secondary windings 12 connected to the single-phase power converters 21 corresponding to the three output phases of the U phase, the V phase, and the W phase, in which the single-phase power converters 21 are on the position which has the same stage number in each output phase, is 20 degrees. However, the embodiment is not limited to this. For example, there may be a series-connected multi-level power conversion device 1A in which the secondary windings 12 are connected to the single-phase power converters 21 under a positional relationship as illustrated in FIG. 14. FIG. 14 is a diagram illustrating another voltage phase relationship among the secondary windings 12 of the multi-winding transformer 10. As illustrated in FIG. 14, it is only necessary that the voltage phase difference between the m secondary windings 12 (one set) obtained by selecting one secondary winding 12 from those connected to the single-phase power converters 21 serially connected to each other for each output phase is 60/m degrees.

Second Embodiment

Figure 15:
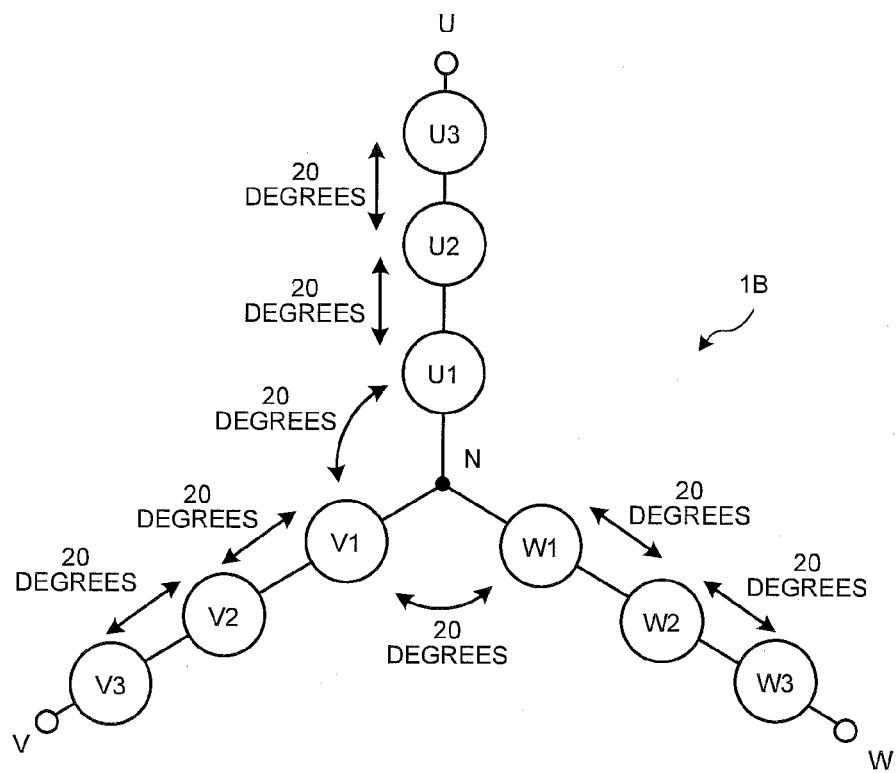
FIG. 15 is a diagram illustrating voltage phase differences between secondary windings of a multi-winding transformer of a series-connected multi-level power conversion device according to a second embodiment.

FIG. 15 is a diagram illustrating voltage phase differences between secondary windings of a multi-winding transformer of a series-connected multi-level power conversion device 1B according to the second embodiment. The series-connected multi-level power conversion device 1B according to the second embodiment has a configuration different from those of the series-connected multi-level power conversion devices 1 and 1A according to the first embodiment in that each output phase is constituted by the three-stage (n=3) single-phase power converters 21.

As illustrated in FIG. 15, in the series-connected multi-level power conversion device 1B according to the second embodiment, a voltage phase difference between the three secondary windings 12 respectively connected to the three single-phase power converters 21 in the same output phase is 20 degrees. More specifically, in the case of the U phase, the voltage phase difference is 20 degrees between the secondary windings 12 corresponding to the positions U1 and U2. Moreover, the voltage phase difference is 20 degrees between the secondary windings 12 corresponding to the positions U2 and U3. This relationship is similarly applied to the V and W phases.

On the other hand, in the multi-winding transformer of the series-connected multi-level power conversion device 1B, a voltage phase difference between the three secondary windings 12 respectively connected to the three single-phase power converters 21 corresponding to different output phases is 20 degrees. More specifically, the voltage phase difference is 20 degrees between the secondary windings 12 corresponding to the positions U1 and V1. Moreover, the voltage phase difference is 20 degrees between the secondary windings 12 corresponding to the positions V1 and W1. This relationship is similarly applied to the secondary windings 12 corresponding to the positions (U2, V2, W2) and the positions (U3, V3, W3).

Similarly to the first embodiment, it is only necessary that the voltage phase difference between the m secondary windings 12 (one set) obtained by selecting one secondary winding 21 from those connected to the single-phase power converters 21 serially connected to each other for each output phase is 60/m degrees. Therefore, the embodiment is not limited to the relationship illustrated in FIG. 15.

As described above, the series-connected multi-level power conversion device 1B according to the second embodiment has the voltage phase difference of 20 degrees between the three secondary windings 12 respectively connected to the three single-phase power converters 21 in the same output phase. Furthermore, the series-connected multi-level power conversion device 1B has the voltage phase difference of 20 degrees between the three secondary windings 12 respectively connected to the three single-phase power converters 21 corresponding to the three output phases of the U phase, the V phase, and the W phase.

Therefore, in the series-connected multi-level power conversion device 1B of the second embodiment, steepled-wave currents with the phase difference of 20/3 degrees are generated in the phases of the primary winding 11 due to the nine single-phase power converters 21 connected to the nine secondary windings 12. As a result, an influence by current pulses can be dispersed and thus current harmonics of the three-phase AC power source 2 are able to be reduced.

In the embodiments, the series-connected multi-level power conversion devices 1, 1A, and 1B, whose output phases are three phases (m=3) and each output phase is constituted by the two or three (n=2 or n=3) single-phase power converters 21, has been explained. The number of output phases and the number of the single-phase power converters 21 that constitute each output phase are not limited to the configuration.

It has been explained in the embodiments that the voltage phases of the secondary windings 12 are advanced in order of the U phase, the V phase, and the W phase (U phase→V phase→W phase) as an example (see FIG. 4). However, the embodiments are not limited to this. For example, the voltage phases of the secondary windings 12 may be advanced like (V phase→W phase→U phase) or (W phase→U phase→V phase). Alternatively, the voltage phases of the secondary windings 12 may be delayed like (V phase→W phase→U phase), (W phase→U phase→V phase), or (U phase→V phase→W phase).

In other words, it is only necessary that the multi-winding transformer 10 satisfies the following conditions. Herein, n and m are coprime.

(1) A voltage phase difference between the n secondary windings 12 respectively connected to the n single-phase power converters 21 in the same output phase is 60/n degrees.

(2) A voltage phase difference between the secondary windings 12 connected to the single-phase power converters 21 corresponding to m output phases is 60/m degrees.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A series-connected multi-level power conversion device comprising:
a multi-winding transformer that distributes AC power input into a primary winding to m×n secondary windings, wherein n and m are coprime integers; and
a power conversion unit that includes m×n single-phase power converters that are respectively connected to the m×n secondary windings, each of m output phases being constituted by serially connected outputs of n single-phase power converters of the m×n single-phase power converters, wherein
the multi-winding transformer has a relationship that the m×n secondary windings have different voltage phases respectively, a second relationship that n secondary windings respectively connected to the n single-phase power converters in a same output phase have a voltage phase difference of 60/n degrees, and a third relationship that m phase-groups each having n voltage phases of the n secondary windings and respectively corresponding to the in output phases have a second voltage phase difference of 60/m degrees between the m phase-groups.

2. The series-connected multi-level power conversion device according to claim 1, wherein the multi-winding transformer has a fourth relationship that secondary windings connected to m single-phase power converters corresponding to the m output phases, in which each of the m single-phase power converters is on a same ordinal position in each of the m output phases, have the second voltage phase difference of 60/m degrees.

3. The series-connected multi-level power conversion device according to claim 2, wherein one or more of the m×n secondary windings of the multi-winding transformer is formed by extended delta connection.

4. The series-connected multi-level power conversion device according to claim 1, wherein one or more of the m×n secondary windings of the multi-winding transformer is formed by extended delta connection.

5. A series-connected multi-level power conversion device comprising:
a multi-winding transformation means that distributes AC power input into a primary winding to m×n secondary windings, wherein n and m are coprime integers; and
a power conversion means that includes m×n single-phase power conversion means that are respectively connected to the m×n secondary windings, each of m output phases being constituted by serially connected outputs of the n single-phase power conversion means of the m×n single-phase power conversion means, wherein
the multi-winding transformation means has a relationship that the m×n secondary windings have different voltage phases respectively, a second relationship that n secondary windings respectively connected to the n single-phase power conversion means in a same output phase have a voltage phase difference of 60/n degrees, and a third relationship that m phase-groups each having n voltage phases of the n secondary windings and respectively corresponding to the m output phases have a second voltage phase difference of 60/m degrees between the in phase-groups.

* * * * *